(12) United States Patent
Oh et al.

(10) Patent No.: US 9,760,277 B2
(45) Date of Patent: Sep. 12, 2017

(54) ELECTRONIC DEVICE AND METHOD FOR DETECTING PROXIMITY INPUT AND TOUCH INPUT

(71) Applicant: Samsung Electronics Co., Ltd., Suwon-si, Gyeonggi-do (KR)

(72) Inventors: Ji-Woong Oh, Gumi-si (KR); Hyun-Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/570,519

(22) Filed: Dec. 15, 2014

(65) Prior Publication Data

US 2015/0185949 A1    Jul. 2, 2015

(30) Foreign Application Priority Data

Dec. 30, 2013    (KR) .......................... 10-2013-0166867

(51) Int. Cl.
*G06F 3/041*    (2006.01)
*G06F 3/0488*    (2013.01)

(52) U.S. Cl.
CPC .................... *G06F 3/0488* (2013.01)

(58) Field of Classification Search
CPC .............................. G06F 3/0416; G06F 3/017
USPC ........................................................ 345/173
See application file for complete search history.

(56) References Cited

U.S. PATENT DOCUMENTS

| 2009/0284495 A1* | 11/2009 | Geaghan ............... G06F 3/0416 345/174 |
| 2009/0289914 A1* | 11/2009 | Cho .......... G06F 3/044 345/173 |
| 2010/0117975 A1 | 5/2010 | Cho |
| 2011/0164060 A1* | 7/2011 | Miyazawa ........... G06F 1/1643 345/660 |
| 2011/0221696 A1 | 9/2011 | Waller et al. |
| 2012/0050180 A1* | 3/2012 | King .................... G06F 3/0416 345/173 |
| 2012/0120017 A1 | 5/2012 | Worfolk et al. |
| 2012/0127115 A1 | 5/2012 | Gannon |
| 2013/0057493 A1 | 3/2013 | Hwang et al. |
| 2013/0083496 A1* | 4/2013 | Franklin ............... G06F 1/1626 361/749 |
| 2014/0238152 A1* | 8/2014 | Kallassi ............ G01R 27/2605 73/862.626 |

FOREIGN PATENT DOCUMENTS

| KR | 10-2010-0052227 A | 5/2010 |
| KR | 10-2013-0015542 A | 2/2013 |

* cited by examiner

*Primary Examiner* — Long D Pham
(74) *Attorney, Agent, or Firm* — Jefferson IP Law, LLP (57) ABSTRACT

A method for detecting an input in an electronic device is provided. The method includes detecting a non-contact proximity input by an input unit at a plurality of points on a screen that is functionally connected to the electronic device, calculating a change in distance from the input unit in response to movement detected by the input unit, for each of the plurality of detected points, and determining at least one of the plurality of points as an input point by the input unit using the calculated change.

10 Claims, 5 Drawing Sheets

ELECTRONIC DEVICE AND METHOD FOR DETECTING PROXIMITY INPUT AND TOUCH INPUT

CROSS-REFERENCE TO RELATED APPLICATION(S)

This application claims the benefit under 35 U.S.C. §119(a) of a Korean patent application filed on Dec. 30, 2013 in the Korean Intellectual Property Office and assigned Serial number 10-2013-0166867, the entire disclosure of which is hereby incorporated by reference.

TECHNICAL FIELD

The present disclosure relates to an electronic device and method for detecting inputs.

BACKGROUND

Recently, various services and additional features provided by electronic devices have increased in number. In order to enhance the utility of the electronic devices and meet various desires of users, a variety of applications executable in the electronic devices have been developed. A user may control an electronic device by applying a touch input onto a screen of the electronic device. In response to the touch input, the electronic device may execute a relevant command by detecting the touch input. With the development of technology, an electronic device may support the features that if a user puts an object (e.g., input unit) in close proximity of a touch screen having a proximity-based touch panel without touching the touch screen, the electronic device may recognize a proximity input depending on a detection signal.

According to the related art, such electronic devices with a screen may include devices such as smart phones, cellular phones, laptop Personal Computers (PCs), tablet PCs, and the like, and the electronic devices may be movable or portable. The screen mounted on the electronic devices may detect a touch or proximity input by an input unit (e.g., user's fingers, an electronic pen, and/or the like). Although such screens are typically flat, flexible screens that can be bent or curved have been recently developed. Accordingly, there is a need to detect an input to a curved portion of a flexible screen.

The method of detecting a touch input or a non-contact proximity input (e.g., hovering input) applied to the flat screen according to the related art may not correctly detect an input at a curved portion of a flexible screen if the screen is deformed.

Therefore, there is a need to determine an input point of an input unit on a flexible screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for detecting inputs on a screen.

Another aspect of the present disclosure is to provide an electronic device and method for detecting an input point using detected points.

In accordance with an aspect of the present disclosure, a method for detecting an input in an electronic device is provided. The method includes detecting a non-contact proximity input by an input unit at a plurality of points on a screen that is functionally connected to the electronic device, calculating a change in distance from the input unit in response to movement detected by the input unit, for each of the plurality of detected points, and determining at least one of the plurality of points as an input point by the input unit using the calculated change.

In accordance with further another aspect of the present disclosure, the method may further include setting a specific region on the screen in association with the plurality of determined points.

In accordance with further another aspect of the present disclosure, the method may further include determining, if the set region is touched by the input unit, the touch by the input unit by first detecting the set region.

In accordance with further another aspect of the present disclosure, the determining at least one of the plurality of points as the input point may include determining at least one point on the screen as a non-contact proximity input point by the input unit in descending order of the calculated change.

In accordance with further another aspect of the present disclosure, the method may further include calculating a distance between the screen and the input unit, for each of the plurality of points.

In accordance with further another aspect of the present disclosure, the change may be calculated based on a moving distance of the input unit during a time difference between a time at which the input unit was detected and a time after a specific time has elapsed.

In accordance with further another aspect of the present disclosure, the screen may include a flexible screen that is freely deformable, and a detection line formed on the screen to detect the input is activated or inactivated in response to the deformation.

In accordance with another aspect of the present disclosure, a method for detecting an input in an electronic device is provided. The method includes detecting a deformation of a screen that is functionally connected to the electronic device, activating at least one detection line that is formed on the screen to detect the input, in response to the detected deformation, and detecting an input by the input unit on the screen on which the detection line is activated.

In accordance with further another aspect of the present disclosure, the method may further include determining a non-contact proximity input by the input unit in at least one point on the screen.

In accordance with further another aspect of the present disclosure, the determining of the non-contact proximity input may include calculating a change in distance between the input unit and the screen in response to movement detected by the input unit, for the at least one point, and determining one of the at least one point as an input point by the input unit using the calculated change.

In accordance with further another aspect of the present disclosure, the determining of the non-contact proximity input may include setting, if the number of determined points is at least two, a specific region in association with the determined points.

In accordance with further another aspect of the present disclosure, the method may further include determining, if the set region is touched by the input unit, the touch by the input unit by first detecting the set region.

In accordance with further another aspect of the present disclosure, the determining of the touch by the input unit may include determining, if the number of determined points is at least two, at least one point on the screen as an input point by the input unit in descending order of the calculated change.

In accordance with further another aspect of the present disclosure, an electronic device for detecting an input is provided. The electronic device includes a screen that is freely deformable and that is configured to detect an input by an input unit and a controller configured to determine a plurality of points on the screen that detects a non-contact proximity input by the input unit, to calculate a change in distance from the input unit for each of the plurality of determined points, and to determine at least one of the plurality of points as an input point by the input unit using the calculated change, to thereby control an operation of the screen.

In accordance with further another aspect of the present disclosure, the screen may have at least one detection line formed thereon to detect the input and the controller may be further configured to activate or inactivate the formed detection line according to a degree of the deformation of the screen.

In accordance with further another aspect of the present disclosure, if the screen is deformed, then the controller may activate a detection line situated in the deformed portion.

In accordance with further another aspect of the present disclosure, the controller may set a region using the plurality of determined points, and if the set region is touched by the input unit, the controller may first recognize the set region.

In accordance with further another aspect of the present disclosure, the controller may be further configured to calculate a distance between the screen and the input unit for each of the plurality of points, and to determine at least one point on the screen as an input point by the input unit in descending order of the calculated change.

In accordance with further another aspect of the present disclosure, the controller may be configured to calculate in real time a distance between the screen and the input unit in response to movement detected by the input unit on the screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Figure 1:
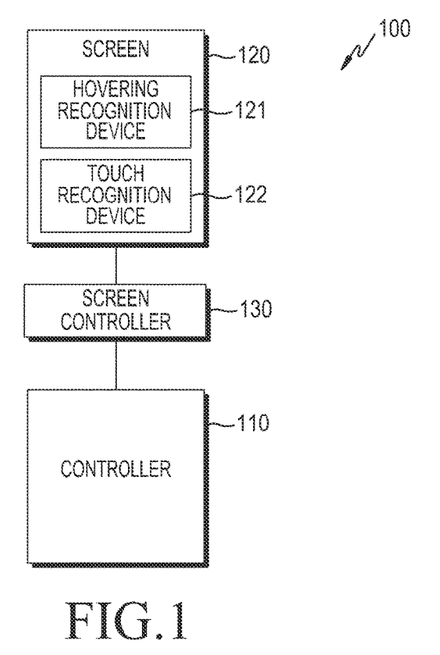
FIG. 1 illustrates an electronic device according to an embodiment of the present disclosure.

FIG. 1 illustrates an electronic device according to an embodiment of the present disclosure.

Referring to FIG. 1, an electronic device 100 may be connected to external devices (not shown) using at least one of a communication unit (not shown), a connector (not shown), an earphone jack (not shown), and/or the like. The electronic device 100 may be in wired connection and/or wireless connection with the external devices. The external device may be an electronic device. For example, the external devices may include various devices such as earphones, external speakers, Universal Serial Bus (USB) memories, chargers, cradles/docks, Digital Multimedia Broadcasting (DMB) antennas, mobile payment devices, healthcare devices (e.g., blood glucose meters, and the like), game consoles, car navigation devices, and/or the like, all of which can be detachably connected to the electronic device 100 by wires. The external devices may include Bluetooth devices, Near Field Communication (NFC) devices, WiFi Direct devices, wireless Access Points (APs), and/or the like, all of which can be wirelessly connected to the electronic device 100. The electronic device 100 may be connected to other devices (e.g., portable terminals, smart phones, tablet PCs, desktop PCs, digitizers, input devices, cameras, servers and the like) by wires or wirelessly.

Referring to FIG. 1, the electronic device 100 may include at least one screen 120 and at least one screen controller 130. The electronic device 100 may include a communication unit (not shown), an Input/Output (I/O) unit (not shown), a power supply (not shown) and a storage (not shown) in addition to the screen 120 and the screen controller 130. The electronic device 100 may include a controller 110.

As discussed above, according to various embodiments of the present disclosure, the electronic device 100 may be a mobile terminal and may include at least one screen, and each screen may display the results obtained by execution of at least one application, and may detect an input by an input unit. The electronic device 100 may include devices having at least one screen, such as smart phones, tablet PCs, 3-Dimensional Televisions (3D-TVs), smart TVs, Light Emitting Diodes (LED) TVs, Liquid Crystal Display (LCD) TVs, table PCs, and/or the like, and may also include all other devices that can communicate with peripheral devices and/or other terminals located in a remote location.

According to various embodiments of the present disclosure, at least one screen mounted on the electronic device 100 may receive at least one of a touch input and a hovering input by an input unit. The input unit may include at least one of an electronic pen, a stylus pen, a roll pen, and/or the like which can provide a command or an input to the electronic device 100 by making a contact or non-contact (e.g., hovering) touch on the screen. The input unit may include at least one of a digital-type pen, a pen without an Integrated Circuit (IC), a pen equipped with an IC, a pen equipped with an IC and a memory, a pen capable of short-range communication, a pen equipped with an ultrasonic detector, a pen equipped with an optical sensor, a joystick, and/or the like. The input unit may also include user's fingers in addition to a variety of such pens. A command that is input to the electronic device by the input unit may include at least one of a touch input and a hovering input.

The electronic device 100 may include at least one screen 120 that provides (e.g., to the user), user interfaces corresponding to various services (e.g., call services, data transfer services, broadcast services, photo shooting services, text message services, and/or the like). Each screen 120 may include a hovering recognition device 121 for recognizing a hovering input by an input unit, and a touch recognition device 122 for recognizing a touch input by the input unit. The hovering recognition device 121 may be called a hovering recognition panel, and the touch recognition device 122 may also be called a touch recognition panel.

Each screen 120 may provide an analog signal corresponding to at least one touch input or at least one hovering input to a user interface, to a screen controller 130 associated therewith. As such, the electronic device 100 may have a plurality of screens, and a screen controller for receiving an analog signal corresponding to a touch input or a hovering input may be provided for each screen 120. Each screen 120 may be connected to each of a plurality of housings by hinge connection, or a plurality of screens may be mounted on a single housing without hinge connection. Although the electronic device 100 according to various embodiments of the present disclosure may include at least one screen 120 as described above, it will be assumed herein that the electronic device 100 has one screen for convenience of description. In addition, the input unit according to various embodiments of the present disclosure may provide a command or an input to the electronic device 100 by making a contact or non-contact (e.g., hovering) touch on the screen 120.

A controller 110 may include a Central Processing Unit (CPU), a Read Only Memory (ROM) storing a control program for control of the electronic device 100, and a Random Access Memory (RAM) that temporarily stores the signals or data received from the outside of the electronic device 100, or is used as a workspace for operations performed in the electronic device 100. The CPU may include a single-core processor, a dual-core processor, a triple-core processor, a quad-core processor, and/or the like.

The controller 110 may control at least one of the screen 120, the hovering recognition device 121, the touch recognition device 122, the screen controller 130, the communication unit (not shown), the I/O unit (not shown), the power supply (not shown), the storage (not shown), and/or the like.

According to various embodiments of the present disclosure, the screen 120 may include a deformable flexible screen that can be flexibly bent or curved by external forces. The screen 120 may have formed thereon at least one detection line of at least one of the hovering recognition device 121 and the touch recognition device 122. According to various embodiments of the present disclosure, at least one detection line may be activated or inactivated under control of the controller 110 upon detection of an input by the input unit or depending on the degree that the screen 120 is bent or curved. The controller 110 may detect a touch input or a hovering input on the screen 120 in response to the degree that the screen 120 is bent or curved.

The controller 110 may determine whether hovering is recognized, which may occur as any one of a variety of input units is in close proximity of at least one object while a variety of objects or input strings are displayed on the screen 120. The controller 110 may identify an object corresponding to the position at which hovering has occurred. The controller 110 may detect a height from the electronic device 100 (e.g., to be specific, the height or distance from the screen 120 of the electronic device 100) to the input unit, and a hovering input event that is associated with the height. The hovering input event may include at least one of an event that a button formed on the input unit is pressed, an event that the input unit is tapped, an event that the input unit moves faster than a predetermined speed, and an event that an object is touched by the input unit, and/or the like.

According to various embodiments of the present disclosure, the controller 110 may detect an input by the input unit on the screen 120. The controller 110 may detect a non-contact proximity input by the input unit on the screen 120. According to various embodiments of the present disclosure, an input may include not only at least one of a touch input and a hovering input on the screen 120, but also a variety of gestures made on the screen 120. The controller 110 may detect a non-contact proximity input by the input unit at a plurality of points on the screen 120, may calculate a change in distance from the input unit (e.g., a change in distance from the screen 120) in response to the movement detected by the input unit, for each of the plurality of detected points, and may determine one or more points among the plurality of points as input points by the input unit, using the calculated change. The controller 110 may detect the input through at least one point on the screen 120. According to various embodiments of the present disclosure, the screen 120 may include a flexible screen that may be bent or curved, or may be freely deformed, by the external forces, conditions, pressure, and/or the like.

In order to detect an input made on the screen 120, at least one detection line may be formed on the screen 120, and at least one detection line formed on the screen 120 may be activated or inactivated by the deformation of the screen 120. The controller 110 may detect at least one of a touch input and a hovering input by the input unit through a plurality of points on the screen 120. The controller 110 may set a region using a plurality of determined non-contact proximity input points. The controller 110 may determine coordinates for a plurality of points (e.g., pixels), at which pressure is detected, and set a region that is formed by the coordinates for each point. If the set region is touched by the input unit, the controller 110 may determine a touch by the input unit by first detecting the circumference of a non-contact proximity input point that is first recognized in the set region. According to various embodiments of the present disclosure, because the screen 120 may be bent or curved, the screen 120 may have more touch points and wider touch regions compared with a number of touch points and width of touch regions on the flat screen. Because of these characteristics of the screen 120, a touched region may span two or more execution icons. If the touched region spans two or more execution icons in this way, the controller 110 may first recognize, as a touch input, a touch that is made at the circumference of a point at which hovering is first recognized.

If an input is detected on the screen 120, the controller 110 may scan the screen 120. If the controller 110 scans the screen 120, the controller 110 may first scan the set region. The controller 110 may determine at least one of a touch input and a hovering input by the input unit by first scanning the set region.

The controller 110 may calculate a change in distance from the input unit in response to the movement detected by the input unit, for each of the plurality of points detected on the screen 120. The controller 110 may calculate a distance between the screen 120 and the input unit, for each of the plurality of points. The controller 110 may calculate in real time the distance between the screen 120 and the input unit, for each of the plurality of points. If the movement detected by the input unit is detected, then the controller 110 may calculate in real time the distance between the screen 120 and the input unit. The distance may be changed by the movement detected by the input unit, and the controller 110 may calculate a difference between the time the input unit was detected and the time after a preset time has elapsed, and the controller 110 may calculate a change in the distance based on the distance that the input unit has moved for the calculated time.

The controller 110 may determine one or more points among the plurality of points as input points by the input unit using the calculated change. The controller 110 may calculate a change in distance from the input unit in response to the movement detected by the input unit, for each of the plurality of points, and may determine one or more points on the screen 120 as input points by the input unit in descending order of the change among the calculated changes. The controller 110 may first determine one or more points on the screen 120 as non-contact proximity input points by the input unit in descending order of the change among the calculated changes. In contrast, the controller 110 may determine one or more points on the screen 120 as input points by the input unit in ascending order of the change among the calculated changes.

According to various embodiments of the present disclosure, the controller 110 may detect an input by the input unit on the screen 120. If the deformation of the screen 120 is detected (e.g., in response to the controller 110 detecting deformation of the screen 120), then the controller 110 may activate at least one detection line that is formed on the screen 120 to detect an input, in response to the detected deformation, and may detect an input by the input unit on the screen 120 on which the detection line is activated. The controller 110 may detect or determine that the screen 120 is deformed or is being deformed by the external forces, conditions, pressure, and/or the like. If the screen 120 is deformed (e.g., in response to the controller 110 detecting deformation of the screen 120), then the controller 110 may activate or inactivate at least one detection line formed on the screen 120. Upon detecting the deformation of the screen 120, the controller 110 may determine a degree of the deformation, and may activate or inactivate at least one detection line formed in the portion at which the degree of the deformation is highest.

The controller 110 may detect at least one of a touch input and a hovering input by the input unit on the deformed screen 120. The controller 110 may determine an input by the input unit in at least one point on the screen 120. The controller 110 may detect the movement detected by the input unit on the screen 120, and calculate a change in distance between the input unit and the screen 120, for each of the at least one point. The controller 110 may calculate the distance between the screen 120 and the input unit, for each of the at least one point. The change may be calculated based on the distance that the input unit has moved during a time difference between the time the input unit was detected and the time after a preset time has elapsed. The controller 110 may determine one of the at least one point as an input point by the input unit, using the calculated change. The controller 110 may determine at least one point on the screen 120 as an input point by the input unit in descending order of the calculated change, or may determine at least one point on the screen 120 as an input point by the input unit in ascending order of the calculated change.

The controller 110 may determine an input by the input unit in at least one point, and if the number of determined points is at least three, the controller 110 may set a region using the determined points. If the number of determined points is two, the controller 110 may set a region in which each point is defined as an end point. The controller 110 may determine coordinates for the at least two points (e.g., pixels) at which an input is detected, and may set a region formed by the coordinates for each point. If the set region is touched by the input unit, the controller 110 may first detect the set region and determine a touch by the input unit. If an input is detected on the screen 120, the controller 110 may scan the screen 120. If the controller 110 scans the screen 120, the controller 110 may first scan the set region. The controller 110 may determine at least one of a touch input and a hovering input by the input unit by first scanning the set region. According to various embodiments of the present disclosure, the controller 110 may calculate in real time the distance between the screen 120 and the input unit in response to the movement detected by the input unit on the screen 120.

The screen 120 may receive or detect at least one of a touch input and a hovering input by the input unit. The screen 120 may include the hovering recognition device 121 that recognizes a hovering input depending on the input method upon receiving an input by a pen (e.g., stylus pen, an electronic pen or the like), and the touch recognition device 122 that recognizes a touch input. The hovering recognition device 121 may determine the distance between the pen and the screen 120 depending on the magnetic field, ultrasonic waves, optical information, surface acoustic waves, and/or the like. The touch recognition device 122 may detect the touched position using the charges that move by the touch. The touch recognition device 122 may detect all types of touches that may cause static electricity, and may also detect the touch made by the input unit (e.g., a finger, a pen, and/or the like). The screen 120 may provide an analog signal corresponding to the at least one gesture to the screen controller 130.

According to various embodiments of the present disclosure, the touch may not be limited to the contact touch (or direct touch) between the screen 120 and the user's body or the touch input unit. For example, the touch may also include the non-contact touch (or indirect touch) between the screen 120 and the user's body or the touch input unit, with a detectable gap between the screen 120 and the user's body or the touch input unit being set in advance (e.g., according to user's preferences, sensitivity configurations, and/or the like). The detectable gap between the screen 120 and the input unit is subject to change depending on the performance or structure of the electronic device 100. For example, the screen 120 may be configured to differently output the values (e.g., analog voltage or current values) detected by a touch event and a hovering event, to make it possible to separately detect the touch event and the non-contact (e.g., hovering) event by the user's body or the input unit. For example, the screen 120 may be configured to output different output values according to whether the touch corresponds to a touch event or a hovering event (e.g., to allow for distinguishing between a touch event and a hovering event). Further, the screen 120 may differently output the detected values (e.g., current values) depending on the distance between the screen 120 and the space where the hovering event has occurred.

The hovering recognition device 121 or the touch recognition device 122 may be implemented in, for example, a resistive type, a capacitive type, an infrared type, an acoustic wave type, and/or the like.

The hovering recognition device 121, which is an Electronic Magnetic Resonance (EMR) touch panel, may include an electromagnetic induction coil sensor (not shown) in which a plurality of loop coils are disposed in a predetermined first direction and a second direction crossing the first direction, forming a grid structure, and an electromagnetic signal processor (not shown) that sequentially provides an Alternating Current (AC) signal having a predetermined frequency to each loop coil in the electromagnetic induction coil sensor. If the input unit with a resonance circuit embedded therein is present around a loop coil in the hovering recognition device 121, a magnetic field transmitted from the loop coil may cause a current that is based on the mutual electromagnetic induction in the resonance circuit in the input unit. Based on the current, an induced magnetic field may occur from a coil (not shown) constituting the resonance circuit in the input unit, and the hovering recognition device 121 may detect the induced magnetic field from a loop coil or a detection line which is in a signal reception state, allowing the electronic device 100 to detect the hovering position of the input unit and/or the touch position of the touch unit, and the height from the touch recognition device 122 to a pen tip of the input unit or the height between the screen 120 and the finger. The detection line may be formed in a grid structure in the hovering recognition device 121. Each detection line may be activated or inactivated in response to an input made on the screen 120. If the screen 120 is deformed by the external forces, conditions, pressure, and/or the like, such as the screen 120 being bent or curved, then each detection line may be activated or inactivated in response to the deformation. If the screen 120 is deformed, then the controller 110 may detect a degree of the deformation, and each detection line may be activated or inactivated under control of the controller 110.

The touch recognition device 122, which is a capacitive touch panel, may be a dielectric coated panel that is formed by coating both sides of a glass with a thin metallic conductive material (e.g., Indium Tin Oxide (ITO) film, and/or the like) to allow a current to flow on the surface of the glass, and that can store charges. If the surface of the touch recognition device 122 is touched by the input unit (e.g., user's fingers, a pen, and/or the like), a predetermined amount of charges may move to the touched position by the static electricity, and the touch recognition device 122 may detect the touched position or the detection line by recognizing a change in current due to the movement of charges. The touch recognition device 122 may detect all types of touches which may cause static electricity, and may detect a touch by both of the finger and the pen, which are input units. The detection line may be formed in a grid structure in the touch recognition device 122. Each detection line may be activated or inactivated in response to an input made on the screen 120. If the screen 120 is deformed by the external forces, conditions, pressure, and/or the like, such as the screen 120 being bent or curved, each detection line may be activated or inactivated in response to the deformation. If the screen 120 is deformed, the controller 110 may detect a degree of the deformation, and each detection line may be activated or inactivated under control of the controller 110.

The screen 120 may include at least two touch screen panels capable of respectively detecting a touch and a proximity by the user's body and the touch input unit, to thereby make it possible to sequentially or simultaneously receive an input by the user's body and an input by the touch input unit. The at least two touch screen panels may provide different output values to the screen controller 130, and the screen controller 130 may differently recognize the values received from the at least two touch screen panels, and determine whether an input from the screen 120 is an input by the user's body or an input by the touch input unit. The screen 120 may display at least one object or an input string.

More specifically, the screen 120 may be formed in a structure in which a touch panel for detecting an input by the input unit depending on a change in induced electromotive force and a touch panel for detecting a touch by the finger or the touch input unit on the screen 120 are sequentially stacked to be in contact with each other, or to be partially spaced apart from each other. The screen 120 may include a plurality of pixels, and display images on the pixels, or may display handwritten information which is input by the finger or the touch input unit. The screen 120 may include a panel. The panel may include a Liquid Crystal Display (LCD) panel, Organic Light Emitting Diodes (OLED) panel, a Light Emitting Diodes (LED) panel, and/or the like.

The screen 120 may include a plurality of sensors for detecting the position at which the finger or the touch input unit is in contact with the surface of the screen 120, or is put in a certain distance from the screen 120. Each of the plurality of sensors may be formed in a coil structure. As for a sensor layer formed of a plurality of sensors, each of the sensors may have a preset pattern, and a plurality of electrode lines may be formed thereon. According to such a structure, if the screen 120 is touched by the finger or the touch input unit (e.g., in response to a touch of the screen 120 using a finger and/or the touch input unit), then the touch recognition device 122 may generate a detection signal indicating a change in waveform due to the change in capacitance between the sensor layer and the input unit, and the screen 120 may provide the generated detection signal to the controller 110. A predetermined distance between the input unit and the hovering recognition device 121 may be determined based on the strength of a magnetic field formed by the coil.

The screen controller 130 may convert an analog signal received by a string that is input on the screen 120, into a digital signal (e.g., X and Y coordinates), and provide the digital signal to the controller 110. The controller 110 may control the screen 120 using the digital signal received from the screen controller 130. For example, the controller 110 may select or execute a shortcut icon (not shown) or an object (not shown) displayed on the screen 120, in response to a touch event or a hovering event. The screen controller 130 may be incorporated into the controller 110.

The screen controller 130 may detect the values (e.g., current values or the like) output from the screen 120, determine the distance between the screen 120 and the space at which a hovering event occurs, convert the determined distance value into a digital signal (e.g., Z coordinates), and provide the digital signal to the controller 110.

Figure 2:
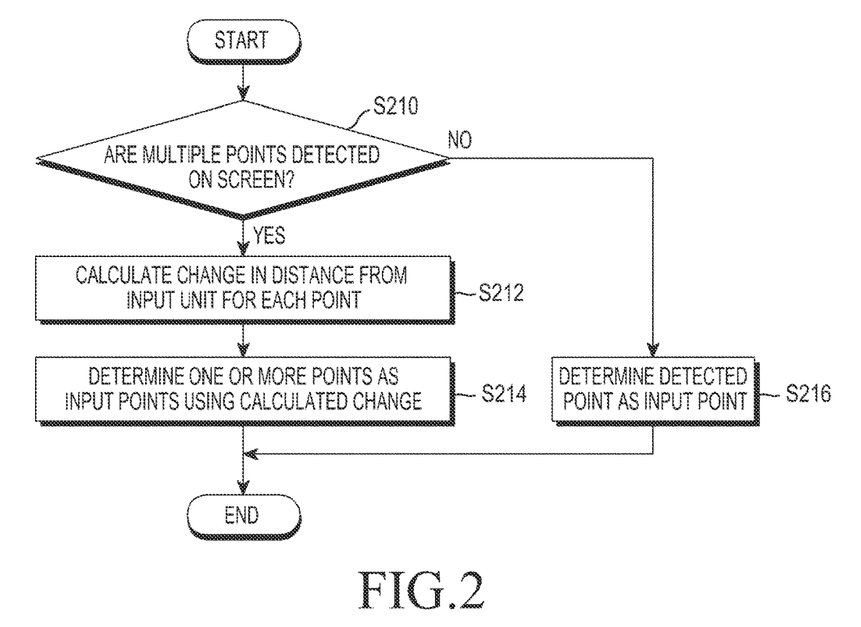
FIG. 2 is a flowchart illustrating a method for detecting an input on a screen according to an embodiment of the present disclosure.

Reference will now be made to FIG. 2 to describe in detail a method for detecting an input on a screen according to an embodiment of the present disclosure.

FIG. 2 is a flowchart illustrating a method for detecting an input on a screen according to an embodiment of the present disclosure.

At operation S210, the controller 110 may determine whether input by an input unit is detected at multiple points on the screen 120.

If the controller 110 determines that a plurality of points at which an input by an input unit is detected at operation S210, then the controller 110 may proceed to operation S212 at which the controller 110 may calculate a change in distance from the input unit, for each of the points.

According to various embodiments of the present disclosure, the controller 110 may detect an input by the input unit on the screen 120. The controller 110 may detect an input by the input unit at a plurality of points on the screen 120. The controller 110 may calculate a distance between the screen 120 and the input unit, for each of the plurality of points. The controller 110 may calculate in real time a distance between the screen 120 and the input unit, for each of the plurality of points. Upon detecting movement detected by the input unit, the controller 110 may calculate in real time a distance between the screen 120 and the input unit. The distance may be changed by the input unit, and the controller 110 may calculate a difference between the time the input unit was detected and the time after a preset time has elapsed, and may calculate a change in the distance based on the distance that the input unit has moved for the calculated time. The controller 110 may determine one or more points among the plurality of points as input points by the input unit using the calculated change. The controller 110 may detect the input using at least one point on the screen 120.

Thereafter, at operation S214, the controller 110 may determine one or more points as input points using the calculated change. The controller 110 may determine one or more points among a plurality of points as input points by the input unit, using the calculated change. The controller 110 may calculate a change in distance from the input unit in response to the movement detected by the input unit, for each of the plurality of points, and may determine one or more points on the screen 120 as input points by the input unit in descending order of the change among the calculated changes. In contrast, the controller 110 may determine one or more points on the screen 120 as input points by the input unit in ascending order of the change among the calculated changes.

In contrast, if the controller 110 determines that an input by the input unit is detected at one point on the screen 120 (e.g., only one point on the screen 120), at operation S210, then the controller 110 may proceed to operation S216 at which the controller 110 may determine the detected point as an input point.

Figure 3:
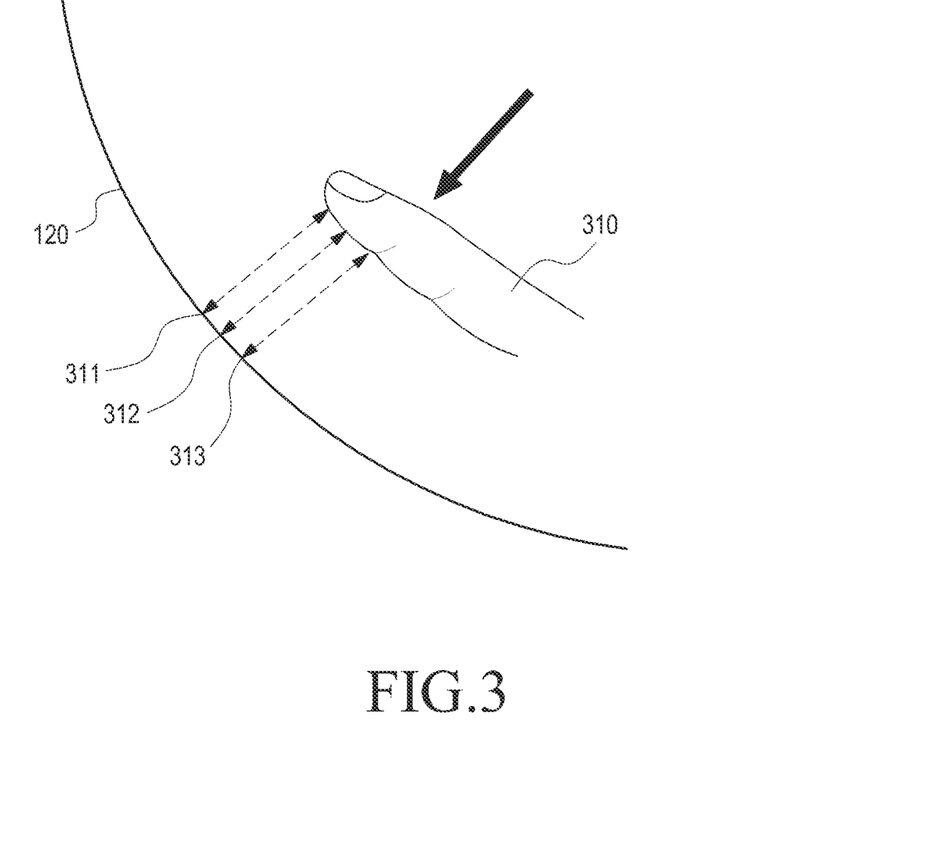
FIG. 3 illustrates a case in which an input on a screen is detected according to an embodiment of the present disclosure.

FIG. 3 illustrates a case in which an input on a screen is detected according to an embodiment of the present disclosure.

According to various embodiments of the present disclosure, the screen 120 may include a flexible screen that may be bent or curved, or may be freely deformed, by the external forces, conditions, pressure, and/or the like. In order to detect an input made on the screen 120, at least one detection line may be formed on the screen 120, and at least one detection line formed on the screen 120 may be activated or inactivated by the deformation of the screen 120.

Referring to FIG. 3, if a proximity (or hovering) of an input unit (e.g., a finger) 310 is detected on the screen 120 that can be bent or curved by the external forces, conditions, pressure, and/or the like, the controller 110 may detect the input unit 310 in at least one point on the screen 120. The controller 110 may detect an input at a plurality of points on the screen 120 because the screen 120 may be bent or curved by the external forces, conditions, pressure or the like. For example, if the finger 310 is in close proximity of the screen 120, then may be a plurality of points on the screen 120, at which the distance between the finger 310 and the screen 120 is the same, or falls within a predetermined threshold range. Although three points 311, 312 and 313 are considered in FIG. 3 by way of example, this is a mere example and the number of points may be subject to change. If the finger 310 is detected at a plurality of points in this way, the controller 110 may calculate a distance from the finger 310 at each point. By re-calculating the distance for each point after a lapse of a specific time, the controller 110 may determine a change in the distance, for each of the plurality of points. The specific time may be determined in advance by the manufacturer, or may be variably adjusted by the user. The calculation may be performed in real time, or may be performed upon occurrence of the movement of the finger 310.

Figure 4:
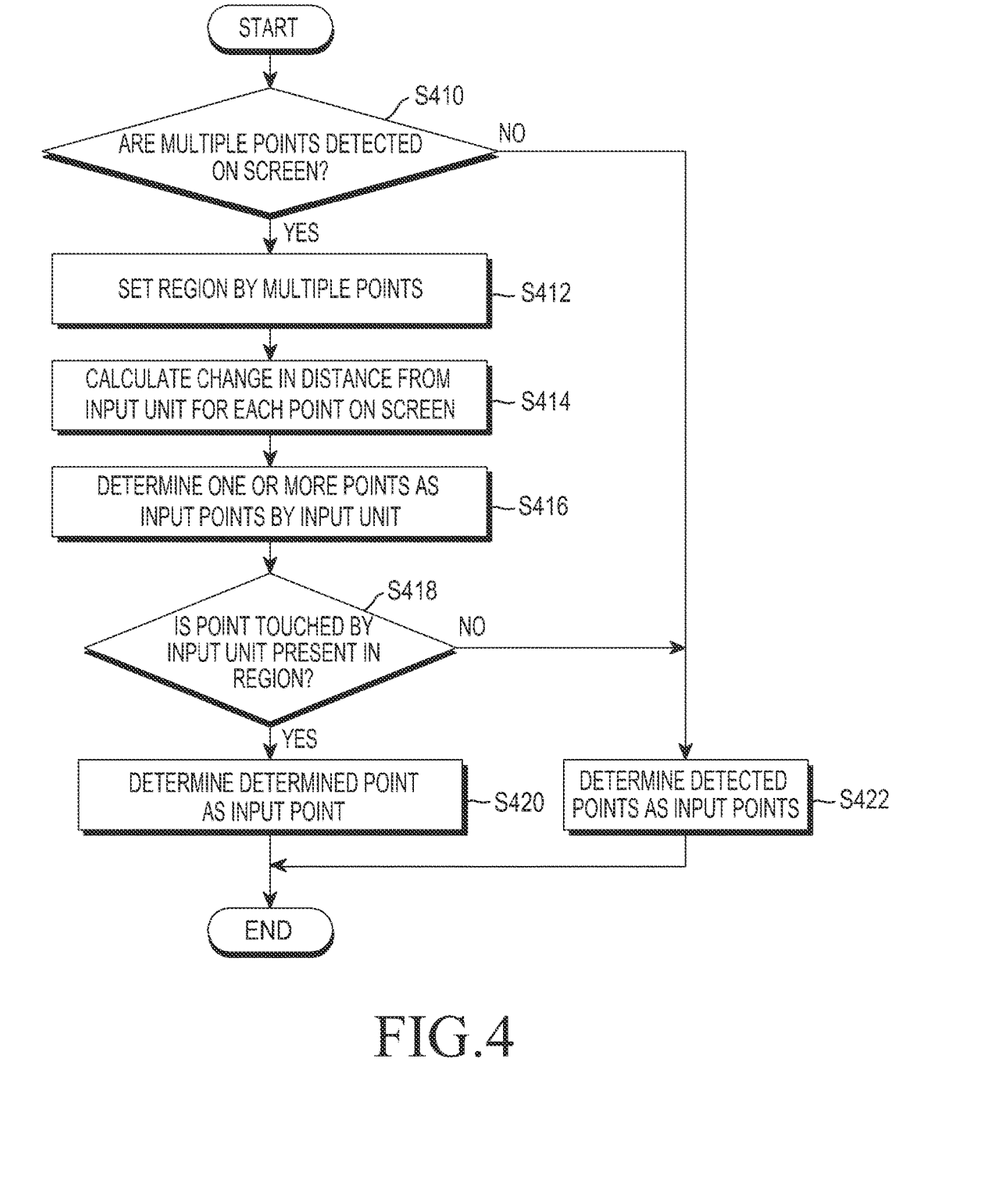
FIG. 4 is a flowchart illustrating a method for detecting an input on a screen according to an embodiment of the present disclosure.

Reference will now be made to FIG. 4 to describe in detail a method for detecting an input on a screen according to an embodiment of the present disclosure.

FIG. 4 is a flowchart illustrating a method for detecting an input on a screen according to an embodiment of the present disclosure.

Referring to FIG. 4, the controller 110 may detect an input by the input unit on the screen 120. The controller 110 may detect deformation of the screen 120. Upon detecting of the deformation of the screen 120, the controller 110 may activate at least one detection line that is formed on the screen 120 to detect an input, in response to the detected deformation, and detect an input by the input unit on the screen 120 on which the detection line is activated. The controller 110 may detect or determine that the screen 120 is deformed or is being deformed by the external forces, conditions, pressure, and/or the like. If the screen 120 is deformed, the controller 110 may activate or inactivate at least one detection line formed on the screen 120. Upon detecting the deformation of the screen 120, the controller 110 may determine a degree of the deformation, and activate or inactivate at least one detection line formed in the portion at which the degree of the deformation is highest.

At operation S410, the controller 110 may determine whether input by an input unit is detected at multiple points on the screen 120.

If the controller 110 determines that a plurality of points at which an input by an input unit is detected on the deformed screen 120 at operation S410, then the controller 110 may proceed to operation S412 at which the controller 110 may set a region using the plurality of detected points.

The controller 110 may determine coordinates for the plurality of detected points (e.g., pixels), and set a region formed by the coordinates for each point. If the set region is touched by the input unit, the controller 110 may determine the touch by the input unit by first detecting the set region. Upon detecting an input on the screen 120, the controller 110 may scan the screen 120. If the controller scans the screen 120, then the controller 110 may first scan the set region. By first scanning the set region, the controller 110 may determine at least one of a touch input by the input unit and a hovering input by the input unit.

At operation S414, the controller 110 may calculate a change in distance from the input unit, for each of the points on the screen 120. The controller 110 may calculate a distance between the screen 120 and the input unit, for each of the plurality of points. The controller 110 may calculate in real time the distance between the screen 120 and the input unit, for each of the plurality of points. Upon detecting movement detected by the input unit, the controller 110 may calculate in real time the distance between the screen 120 and the input unit. The distance may be changed by the input unit, and the controller 110 may calculate a difference between the time the input unit was detected and the time after a preset time has elapsed, and may calculate a change in the distance based on the distance that the input unit has moved for the calculated time.

At operation S416, the controller 110 may determine one or more points as input points by the input unit using the calculated change. The controller 110 may determine one of the detected at least one point as an input point by the input unit, using the calculated change.

At operation S418, the controller 110 may determine whether a point touched by the input unit is within the region.

If the controller 110 determines that a point touched by the input unit on the screen 120 is present in the region at operation S418, then the controller 110 may proceed to operation S420 at which the controller 110 may determine the determined point as an input point. Upon detecting a touch input that is made by the input unit in the region, the controller 110 may determine the touch input by the input unit by first detecting the set region. Upon detecting an input on the screen 120, the controller 110 may scan the screen 120. If the controller 110 scans the screen 120, then the controller 110 may first scan the set region. By first scanning the set region, the controller 110 may determine at least one of a touch input by the input unit and a hovering input by the touch unit. The outside of the set region may be touched by the input unit, and in this case, the controller 110 may determine the touched point as an input point.

In contrast, if the controller 110 determines that a point touched by the input unit on the screen 120 is not present in the region, then the controller 110 may proceed to operation S422 at which the controller may determine the points at which inputs are detected as input points.

In contrast, if the controller 110 determines that an input by the input unit is detected at one detected point (e.g., only one point on the screen 120), then the controller 110 may proceed to operation S422 at which the controller 110 may determine the detected point as an input point. If there is one point at which an input is detected by the input unit on the screen 120, the controller 110 may determine the detected point as an input point. This case may correspond to a case in which an end of the input unit is sharp.

Figure 5A:
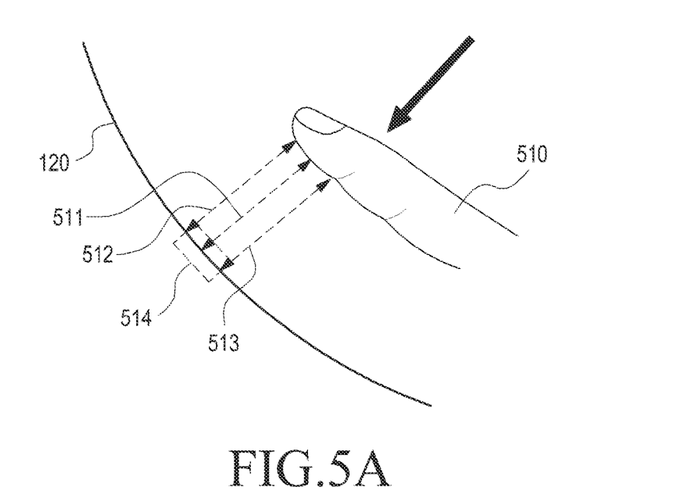
FIG. 5A illustrates a case in which a plurality of points at which an input unit is detected on a screen according to an embodiment of the present disclosure.
Figure 5B:
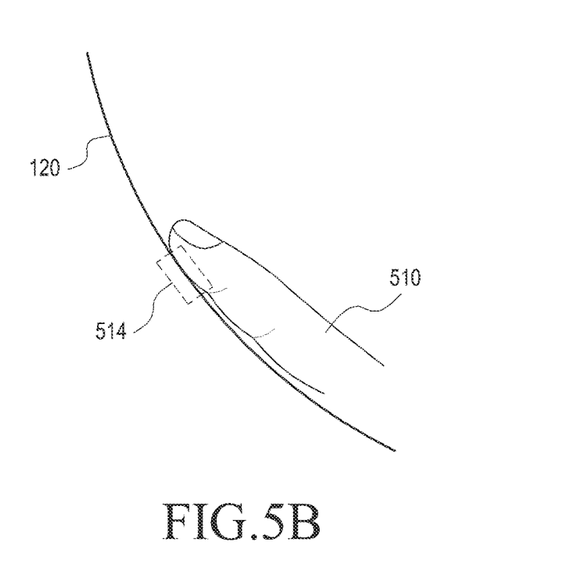
FIG. 5B illustrates a case in which a touch by an input unit is made in an outside of a region that is set using a plurality of points at which the input unit is detected on a screen according to an embodiment of the present disclosure.
Figure 5C:
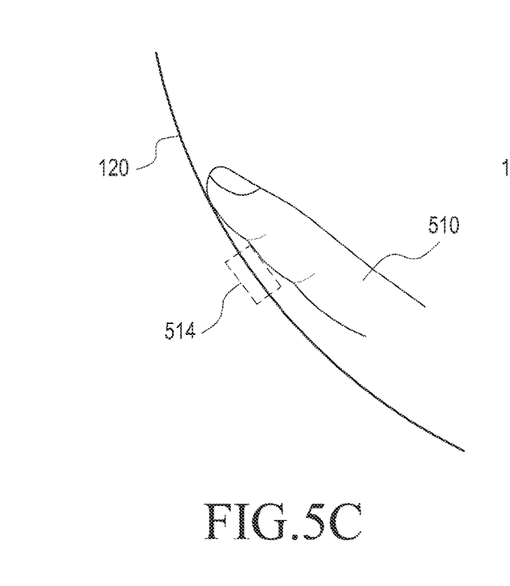
FIG. 5C illustrates a case in which a touch by an input unit is made in an inside of a region that is set using a plurality of points at which the input unit is detected on a screen according to an embodiment of the present disclosure.

Reference will now be made to FIGS. 5A to 5C to describe an example of detecting an input on a screen according to an embodiment of the present disclosure.

FIGS. 5A to 5C illustrate an example of detecting an input on a screen according to an embodiment of the present disclosure.

Referring to FIG. 5A, a case in which a plurality of points at which an input unit is detected on a screen is provided. Referring to FIG. 5B, a case in which a touch by an input unit is made in the outside of a region that is set using a plurality of points at which the input unit is detected on a screen is provided. Referring to FIG. 5C, a case in which a touch by an input unit is made in the inside of a region that is set using a plurality of points at which the input unit is detected on a screen is provided.

Referring to FIG. 5A, the screen 120 may include a flexible screen that may be bent or curved, or may be freely deformed, by the external forces, conditions, pressure, and/or the like. In order to detect an input made on the screen 120, at least one detection line may be formed on the screen 120, and at least one detection line formed on the screen 120 may be activated or inactivated by the deformation of the screen 120.

If a proximity (or hovering) of an input unit (e.g., a finger) 510 is detected on the screen 120 that can be bent or curved by the external forces, conditions, pressure or the like, then the controller 110 may detect the input unit 510 in at least one point on the screen 120. The controller 110 may detect a plurality of points on the screen 120 at which the input unit 510 is detected because the screen 120 may be bent or curved by the external forces, conditions, pressure, and/or the like. If the input unit 510 is detected at three points 511, 512 and 513, as illustrated in FIG. 5A, then the controller 110 may set a region 514 using the three points. The controller 110 may calculate a distance from the input unit, at each of the three points 511, 512 and 513. By re-calculating the distance for each point after a lapse of a specific time, the controller 110 may determine a change in the distance, for each of the plurality of points. The calculation may be performed in real time, or may be performed upon occurrence of the movement of the finger 510.

Referring to FIG. 5B, if a touch by the input unit 510 is made in the outside of the region 514 that is set using the plurality of points at which the input unit is detected on the screen 120, then the controller 110 may release the function of first detecting the region 514, and may then determine the point touched by the input unit 510.

Referring to FIG. 5C, if a touch by the input unit 510 is made in the inside of the region 514 that is set using the plurality of points at which the input unit is detected on the screen 120, then the controller 110 may determine the touch by the input unit 510 by first detecting the set region 514. Upon detecting an input on the screen 120, the controller 110 may scan the screen 120. If the controller 110 scans the screen 120, the controller 110 may first scan the set region. By first scanning the set region 514, the controller 110 may determine a touch by the input unit 510.

Figure 6:
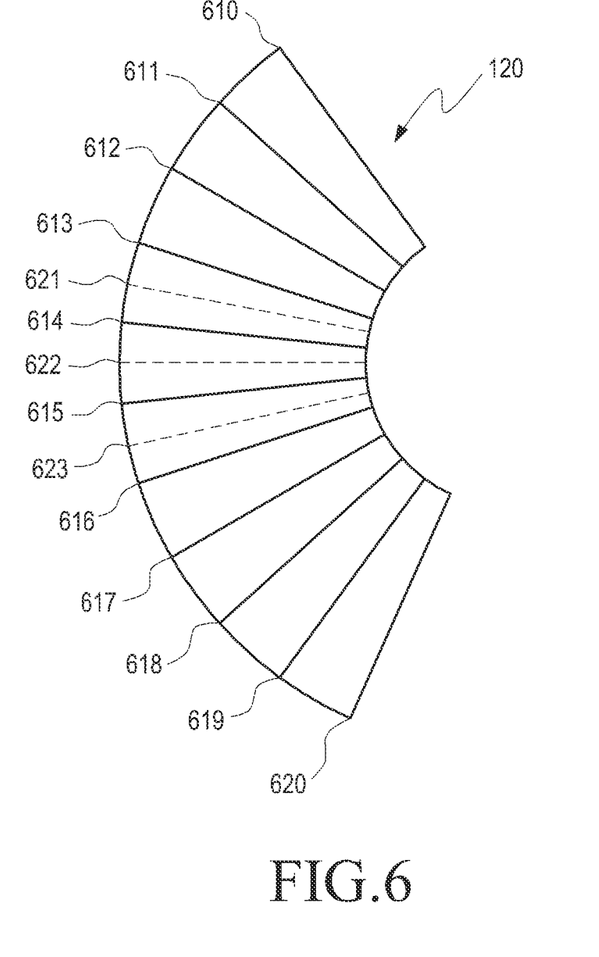
FIG. 6 illustrates at least one detection line that is formed on a screen to detect at least one of a touch input and a hovering input by an input unit according to an embodiment of the present disclosure.

FIG. 6 illustrates at least one detection line that is formed on a screen to detect at least one of a touch input and a hovering input by an input unit according to an embodiment of the present disclosure.

Referring to FIG. 6, the screen 120 may include a flexible screen that may be bent or curved, or may be freely deformed, by the external forces, conditions, pressure, and/or the like. At least one detection line 610, 611, 612, 613, 614, 615, 616, 617, 618, 619 and 620 may be formed on the screen 120 to detect an input made on the screen 120, and at least one detection line formed on the screen 120 may be activated or inactivated by the deformation of the screen 120. The screen 120 may be additionally have formed thereon detection lines 621, 622 and 623, which are activated in response to a degree that the screen 120 is bent or curved. The detection lines 621, 622 and 623 may be activated under control of the controller 110 if the screen 120 is bent at the central portion thereof as illustrated in FIG. 6. Although the detection lines are horizontally formed on the screen 120 in FIG. 6, the detection lines may be vertically formed on the screen 120. In addition, detection lines may be formed horizontally and vertically on the screen 120 in a grid structure. As a gap between the detection lines is narrower, an input point by the input unit may be more accurately determined.

It can be appreciated that various embodiments of the present disclosure may be implemented in the form of hardware, software, or a combination thereof. Any such software may be stored in volatile or nonvolatile storage (e.g., erasable/re-writable Read Only Memory (ROM)), memory (e.g., Random Access Memory (RAM), memory chip, memory device, or memory Integrated Circuit (IC), and/or the like), or optically/magnetically recordable non-transitory machine readable storage media (e.g., non-transitory computer-readable storage media) (e.g., Compact Disk (CD), Digital Versatile Disk (DVD), magnetic disk, magnetic tape, and/or the like). It can be noted that the storage that can be mounted in the electronic device is one example of non-transitory machine-readable storage media suitable to store a program or programs including instructions for implementing various embodiments of the present disclosure. Therefore, the present disclosure may include a program including codes for implementing the apparatus or method as defined by the appended claims, and non-transitory machine readable storage media (e.g., non-transitory computer-readable storage media) storing the program. The program may be electronically carried by any media such as communication signals which are transmitted through wired/wireless connections.

The electronic device may receive and store the program from a program server, to which the electronic device is connected by wires or wirelessly. The program server may include a memory for storing a program including instructions for performing the method of detecting an input on the screen by the electronic device, and storing information needed for the input detection method, a communication unit for performing wired/wireless communication with the electronic device, and a controller for transmitting the program to the electronic device automatically or at the request of the electronic device.

As is apparent from the foregoing description, according to various embodiments of the present disclosure, the electronic device may exactly determine the user desired point by detecting an input on the screen. In addition, the electronic device may activate a detection line formed on the screen by detecting deformation of the screen, making more accurate determination of the user input point possible, thereby improving the resolution of the screen.

Further, according to various embodiments of the present disclosure, the electronic device may detect an input by the input unit at a plurality of points on the screen, and calculate a change in distance from the input unit, for each of the pints, to thereby determine one or more points among the plurality of points as input points, making it possible to prevent recognition errors.

Moreover, the electronic device may activate at least one detection line by detecting deformation of the screen, thereby determining an exact user input point.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for detecting an input in an electronic device, the method comprising:
   detecting a deformation of a flexible screen that is connected to the electronic device;
   activating at least one detection line that is formed on the flexible screen to detect the input by an input unit, in response to the detected deformation;
   detecting a non-contact proximity input by the input unit at a plurality of points on the flexible screen on which the at least one detection line is activated;
   calculating a change in distance from the input unit in response to movement detected by the input unit, for each of the plurality of detected points;
   determining at least one point on the flexible screen as the non-contact proximity input point by the input unit in descending order of the calculated each of the plurality of change;
   setting a specific region on the flexible screen in association with the plurality of determined points; and
   determining, if the set specific region is touched by the input unit, the touch by the input unit by first detecting the set specific region.

2. The method of claim 1, further comprising:
   calculating a distance between the flexible screen and the input unit, for each of the plurality of points.

3. The method of claim 1, wherein the change is calculated based on a moving distance of the input unit during a time difference between a time at which the input unit was detected and a time after a specific time has elapsed.

4. The method of claim 1,
   wherein the screen comprises:
      a flexible screen that is freely deformable, and
      a detection line formed on the flexible screen, and
   wherein the detection line is configured to detect whether the input is activated or inactivated in response to the deformation.

5. A non-transitory computer-readable storage medium storing instructions that, when executed, cause at least one processor to perform the method of claim 1.

6. The method of claim 1, further comprising:
   detecting the input by the input unit;
   determining whether the input is within the specific region; and
   determining, if the input is not within the specific region, a point at which the input is input to be an input point.

7. An electronic device for detecting an input, the electronic device comprising:
   a flexible screen configured to detect the input by an input unit; and
   a controller configured to:
      detect a deformation of the flexible screen that is connected to the electronic device,
      activate at least one detection line that is formed on the flexible screen to detect the input by the input unit, in response to the detected deformation,
      detect a non-contact proximity input by the input unit at a plurality of points on the flexible screen on which the at least one detection line is activated,
      calculate a change in distance from the input unit in response to movement detected by the input unit, for each of the plurality of determined points,
      determine at least one point on the flexible screen as the non-contact proximity input point by the input unit in descending order of the calculated each of the plurality of change,
      set a specific region on the flexible screen in association with the plurality of determined points, and
      determine, if the set specific region is touched by the input unit, the touch by the input unit by first detecting the set specific region.

8. The electronic device of claim 7, wherein the controller is further configured to activate or inactivate the formed detection line according to a degree of the deformation of the flexible screen.

9. The electronic device of claim 7, wherein the controller is further configured to calculate in real time a distance between the flexible screen and the input unit in response to movement detected by the input unit on the flexible screen.

10. The electronic device of claim 7, wherein the controller is further configured to:
   determine whether the input is within the region, and
   determine, if the input is determined not to be within the region, a point at which the input is input to be an input point.

* * * * *